United States Patent
Iijima et al.

(10) Patent No.: US 10,627,807 B2
(45) Date of Patent: Apr. 21, 2020

(54) MOTOR CONTROLLER

(71) Applicant: FANUC CORPORATION, Minamitsuru-gun, Yamanashi (JP)

(72) Inventors: Kazunori Iijima, Yamanashi (JP); Yuusaku Oho, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/004,712

(22) Filed: Jun. 11, 2018

(65) Prior Publication Data
US 2018/0364684 A1 Dec. 20, 2018

(30) Foreign Application Priority Data

Jun. 14, 2017 (JP) ................... 2017-116584

(51) Int. Cl.
*G05B 19/416* (2006.01)
(52) U.S. Cl.
CPC .. *G05B 19/416* (2013.01); *G05B 2219/37388* (2013.01); *G05B 2219/43006* (2013.01)
(58) Field of Classification Search
None
See application file for complete search history.

(56) References Cited

U.S. PATENT DOCUMENTS 4,792,737 A * 12/1988 Goff .................. G05B 13/04
318/560

5,159,254 A * 10/1992 Teshima ............. G05B 19/4063
318/610

(Continued)

FOREIGN PATENT DOCUMENTS

| JP | 2005-6418 | 1/2005 |
| JP | 2007-141189 | 6/2007 |

(Continued)

OTHER PUBLICATIONS

Notification of Reasons for Refusal dated Jun. 25, 2019 in Japanese Patent Application No. 2018-113500.

(Continued)

*Primary Examiner* — Ramesh B Patel
(74) *Attorney, Agent, or Firm* — Wenderoth, Lind & Ponack, L.L.P.

(57) ABSTRACT

A controller of a motor that drives a driven body, the controller includes: a command generating unit that generates a movement command for the motor; an inertia estimating unit that acquires feedback information of the motor and estimates an inertia on the basis of a predetermined estimation equation; a difference computing unit that computes a change in the inertia changed with machining based on the movement command of the command generating unit; and a comparing unit that compares a difference between the estimation results before and after the machining of the driven body estimated by the inertia estimating unit and the change in the inertia computed by the difference computing unit. the estimation equation of the inertia estimating unit is corrected on the basis of a comparison result of the comparing unit so that the difference between the estimation results matches a computation result obtained by the difference computing unit.

3 Claims, 5 Drawing Sheets

(56) References Cited

U.S. PATENT DOCUMENTS

| | | | | |
|---|---|---|---|---|
| 6,157,156 A * | 12/2000 | Tsuruta | ............... | H02P 23/14 318/568.22 |
| 6,566,835 B1 * | 5/2003 | Yoshida | ............... | G05B 19/404 318/569 |
| 7,902,780 B2 * | 3/2011 | Okita | ............... | G05B 19/404 318/432 |
| 2002/0156541 A1 * | 10/2002 | Yutkowitz | ............... | G05B 11/28 700/28 |
| 2005/0137739 A1 * | 6/2005 | Yoshida | ............... | G05B 19/404 700/170 |
| 2007/0150076 A1 * | 6/2007 | Schmidt | ............... | G05B 13/042 700/29 |
| 2007/0152276 A1 | 7/2007 | Arnold et al. | | |
| 2007/0296361 A1 * | 12/2007 | Tajima | ............... | H02P 23/14 318/268 |
| 2010/0052593 A1 * | 3/2010 | Kishimoto | ............... | H02P 23/22 318/561 |
| 2012/0283851 A1 * | 11/2012 | Yamamoto | ............... | G05B 19/19 700/56 |
| 2013/0238101 A1 * | 9/2013 | Kuramoto | ............... | G05B 19/404 700/19 |
| 2014/0292239 A1 * | 10/2014 | Kato | ............... | H02P 21/0017 318/400.02 |
| 2016/0233808 A1 * | 8/2016 | Yoshiura | ............... | H02P 6/10 |
| 2017/0104431 A1 * | 4/2017 | Hachiya | ............... | H02P 29/40 |
| 2017/0146971 A1 * | 5/2017 | Ono | ............... | H02K 11/21 |

FOREIGN PATENT DOCUMENTS

| | | |
|---|---|---|
| JP | 2007-226836 | 9/2007 |
| JP | 2010-148178 | 7/2010 |
| JP | 2010-211467 | 9/2010 |
| JP | 2011-134169 | 7/2011 |
| JP | 2011-235374 | 11/2011 |
| WO | 2013/073436 | 5/2013 |

OTHER PUBLICATIONS

Office Action dated Feb. 21, 2020 in Chinese Patent Application No. 201810597456.9.

* cited by examiner

MOTOR CONTROLLER

This application is based on and claims the benefit of priority from Japanese Patent Application No. 2017-116584, filed on 14 Jun. 2017, the content of which is incorporated herein by reference.

BACKGROUND OF THE INVENTION

Field of the Invention

The present invention relates to a controller of a motor that drives a driven body.

Related Art

Conventionally, Patent Documents 1 to 4 disclose techniques related to a controller for controlling a motor to operate a driven body.

Patent Document 1 discloses a technique of gradually changing parameters until a difference between a command and a feedback is smaller than an allowable value when an optimal value of a servo parameter changes with aging. In Patent Document 1, a time constant is increased until a positional deviation falls within an allowable range by gradually decreasing an acceleration when a vibration is likely to occur in an actual response and when tracking ability of control is low.

Patent Document 2 discloses a method of detecting an acceleration using an acceleration detector and correcting a gain when the acceleration exceeds a certain threshold. In Patent Document 2, when it is determined whether an instantaneous value, a mean value, or a square mean value of an acceleration difference between a motor and a load structure is larger than a predetermined value, the acceleration difference is obtained using an angular detection value of the motor and an acceleration detection value of the load structure.

Patent Document 3 discloses a technique of storing a gain table and reading an optimal gain according to machine rigidity in a device and a method for setting control parameters of a motor controller. Patent Document 3 relates to a technique of changing a gain value of a PI controller of a servo system and discloses a gain scheduling method of increasing the gain when the inertia of a load is large and decreasing the gain when the inertia of a load is small.

Patent Document 4 discloses a technique of computing the inertia from a torque constant of a motor and a representative current value and a representative acceleration value obtained from current values and acceleration values in a plurality of periods of a sinusoidal command, stored in a sampling data storing unit as a method for estimating the inertia.

Patent Document 1: Japanese Unexamined Patent Application, Publication No. 2011-134169

Patent Document 2: Japanese Unexamined Patent Application, Publication No. 2007-141189

Patent Document 3: Japanese Unexamined Patent Application, Publication No. 2005-006418

Patent Document 4: Japanese Unexamined Patent Application, Publication No. 2010-148178

SUMMARY OF THE INVENTION

However, an operation of a driven body (work) operated by a motor is determined by an acceleration or deceleration time constant adjusted on the basis of a maximum loading capacity of a machine tool. From the viewpoint of efficiency, it is preferable that an acceleration time is as short as possible within an allowable range of an output torque although the output torque is different depending on a load or the like of a machining target work or a mechanism of a machine tool for moving the work. On the other hand, when the motor is operated in an extremely short acceleration time (an acceleration or deceleration time constant), the position control of the motor may become unstable (a vibration may occur).

Although the conventional techniques disclose a method for adjusting an acceleration or deceleration, when an acceleration or deceleration time constant is set on the basis of inertia, it is difficult to eliminate the effect of friction occurring in a motor during machining, misalignment of the work, or the like, and a difference may occur between estimated inertia and actual inertia. The motor may operate at an excessively high acceleration depending on how an inertia estimation result shifts from the actual inertia. The conventional techniques have a room for improvement in that inertia is estimated more accurately according to an actual situation.

An object of the present invention is to provide a motor controller capable of estimating an inertia with high accuracy with respect to a machining target driven body.

(1) The present invention provides a controller (for example, a controller 2 to be described later) of a motor (for example, a motor 10 to be described later) that drives a driven body (for example, a work W to be described later), the controller including: a command generating unit (for example, a command generating unit 21 to be described later) that generates a movement command for the motor; an inertia estimating unit (for example, an inertia estimating unit 22 to be described later) that acquires feedback information of the motor and estimates an inertia on the basis of a predetermined estimation equation; a difference computing unit (for example, a difference computing unit 23 to be described later) that computes a change in the inertia changed with machining based on the movement command of the command generating unit; and a comparing unit (for example, a comparing unit 24 to be described later) that compares a difference between the estimation results before and after the machining of the driven body estimated by the inertia estimating unit and the change in the inertia computed by the difference computing unit, wherein the estimation equation of the inertia estimating unit is corrected on the basis of a comparison result of the comparing unit so that the difference between the estimation results matches a computation result obtained by the difference computing unit.

(2) In the controller according to (1), the difference computing unit may acquire a volume of the driven body decreased with machining from the command generating unit and compute the change in the inertia on the basis of the volume of the driven body and a density set to the driven body.

(3) In the controller according to (1) or (2), the inertia estimating unit may acquire an effective load on the weight changed with machining and center-of-gravity position information indicating a position of a center of gravity of the driven body and computes the change in the inertia on the basis of the effective load.

(4) In the controller according to any one of (1) to (3), the command generating unit may adjust an acceleration or deceleration time constant of the motor on the basis of an estimation result of the estimation equation.

According to the motor controller of the present invention, it is possible to estimate an inertia with accuracy with respect to a machining target driven body.

DETAILED DESCRIPTION OF THE INVENTION

Hereinafter, a preferred embodiment of the present invention will be described with reference to the drawings.

Figure 1:
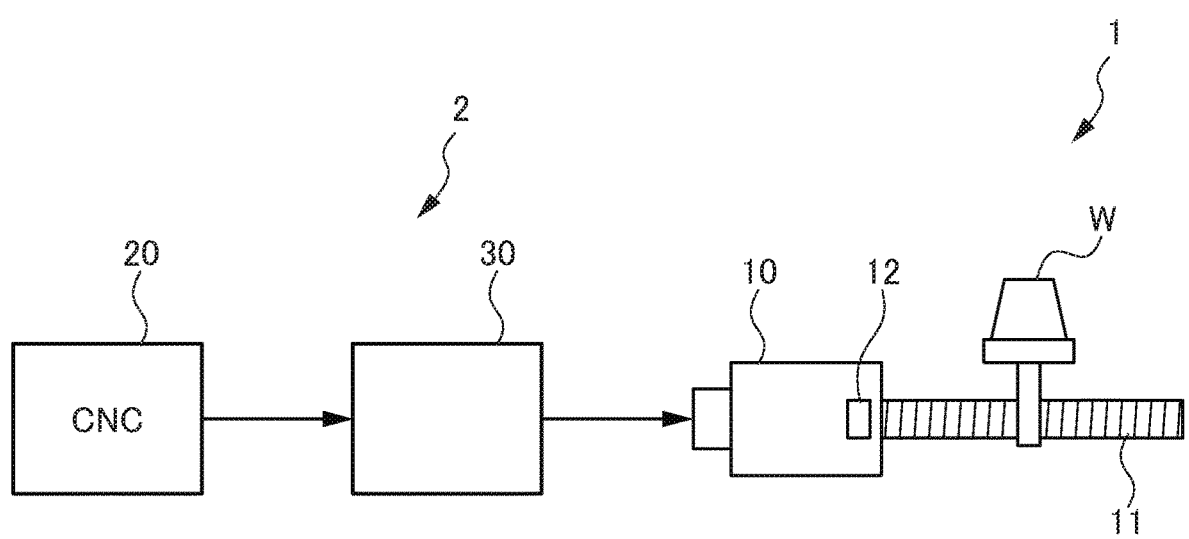
FIG. 1 is a diagram schematically illustrating a machine tool to which a controller according to an embodiment of the present invention is applied.

FIG. 1 is a diagram schematically illustrating a machine tool 1 to which a controller according to an embodiment of the present invention is applied. First, a configuration example of the machine tool 1 will be described. The machine tool 1 illustrated in FIG. 1 is a machining device that machines a work (a driven body) W into a desired shape.

The machine tool 1 of the present embodiment includes a controller 2 including a numerical controller 20 and a servo controller 30, a motor 10 controlled by the controller 2, and a feed shaft (a transmission mechanism) 11 that moves the work W using the driving force of the motor 10.

The numerical controller 20 is a computerized numerical control (CNC) and performs various processes of controlling the machine tool 1. The servo controller 30 controls driving of the motor 10 on the basis of a command from the numerical controller 20.

The motor 10 is a servomotor that applies definition to the feed shaft 11. When the feed shaft 11 is driven, the work W which is a driven body moves to a predetermined position. A position detector 12 such as an encoder is attached to the motor 10, and a detection signal obtained by the position detector 12 is used for various processes such as feedback control.

Figure 2:
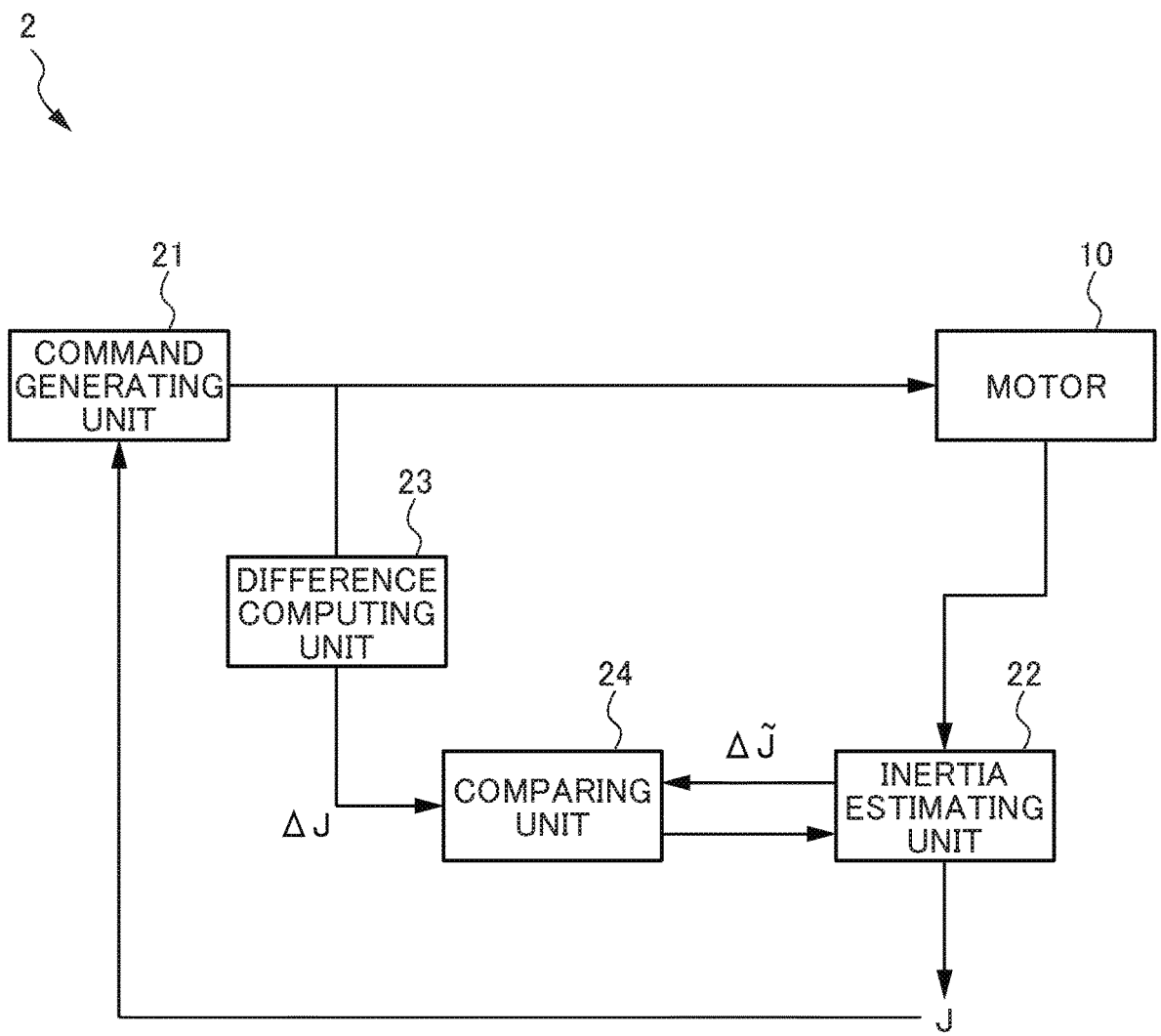
FIG. 2 is a block diagram illustrating a configuration related to servo control of the controller according to the present embodiment.

Next, a configuration of estimating inertia will be described. FIG. 2 is a block diagram illustrating a configuration related to servo control of the controller 2 according to the present embodiment. The respective units illustrated in FIG. 2 are realized by the numerical controller 20 or the servo controller 30, and an arrangement position thereof is not particularly limited. The functions may be realized by the numerical controller 20, the servo controller 30, or an external device other than the numerical controller 20 and the servo controller 30.

As illustrated in FIG. 2, the controller 2 includes a command generating unit 21, an inertia estimating unit 22, a difference computing unit 23, and a comparing unit 24.

The command generating unit 21 generates a movement command for moving the work W. The motor 10 is driven on the basis of the movement command from the command generating unit 21 to rotate the feed shaft 11 to thereby move the position of the work W.

A time constant of an acceleration or deceleration command and a speed gain in machining conditions are set to the command generating unit 21. The time constant of the acceleration or deceleration command and the speed gain are set on the basis of an expected inertia.

The inertia estimating unit 22 estimates the inertia of the work W mounted in the machine tool 1 on the basis of a feedback signal (feedback information) of the motor 10 acquired during a predetermined operation. The feedback signal of the motor 10 relates to torque, current, speed, and the like. For example, the inertia is calculated on the basis of a speed feedback signal from the position detector 12 of the motor 10 and a current feedback signal from an amplifier (not illustrated) of the servo controller 30.

The inertia estimating unit 22 calculates the inertia on the basis of a predetermined estimation equation. Equation (1) below can be used as the inertia estimation equation, for example. The inertia estimating unit 22 acquires variables such as current I, an angular acceleration w, and disturbance Tf as feedback signals to estimate inertia. The current feedback signal can be acquired as an effective current calculated using the phase information of the position detector 12. The angular acceleration w can be obtained by differentiating an angular speed, for example. The inertia estimation method is not limited to this method but can be changed appropriately.

$$Jw = (kt \cdot I - Tf)/\omega \quad (1)$$

Jw: Inertia
kt: Torque constant
I: Current
Tf: Disturbance (Friction or the like)
ω: Angular acceleration A process of adjusting the time constant of acceleration or deceleration optimally on the basis of the estimated inertia (hereinafter, estimation inertia) is performed. Although the output torque to be generated by the motor 10 is different depending on the load of the machining target work W and a mechanism of the machine tool 1 for moving the work W, it is preferable that the acceleration time is as short as possible within an allowable range of the output torque. On the other hand, when the motor is operated in an extremely short acceleration time (an acceleration or deceleration time constant), the position control of the motor may become unstable (a vibration may occur). For example, when the acceleration or deceleration time constant is set to be shorter than an appropriate value in relation to the performance of the motor 10 and the inertia of the work W, it may not be possible to perform the commanded acceleration or deceleration due to restriction of the performance of the motor 10, the output torque may saturate in relation to a command torque, and it may not be possible to perform control properly. In contrast, when the acceleration or deceleration time constant is set to be longer than an appropriate value, acceleration or deceleration is performed slower than necessary which results in a decrease in efficiency. Therefore, the acceleration or deceleration time constant is adjusted optimally on the basis of estimation inertia.

In the process of optimizing the acceleration or deceleration time constant, for example, an optimal time constant for inertia is obtained in advance theoretically or experimentally, and the optimal time constant is set on the basis of the estimated inertia. The optimal time constant may be selected from predetermined values and may be calculated sequentially, and an appropriate method may be employed.

The difference computing unit 23 and the comparing unit 24 correct the estimation equation of the inertia estimating unit 22. Due to the influence of misalignment from the setting position of the work W and friction, the estimation inertia may deviate from an actual inertia.

Figure 3:
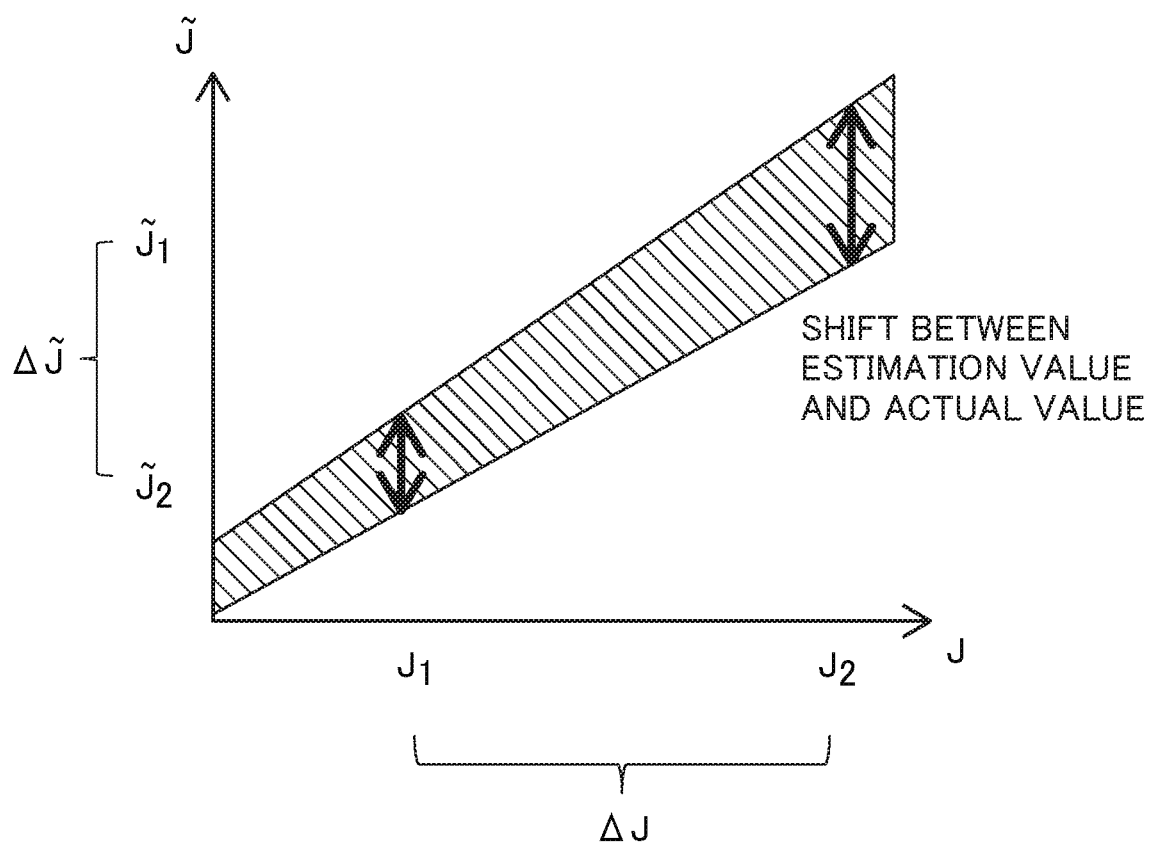
FIG. 3 is an explanatory diagram for describing a shift between an estimation inertia (an estimation value) and an actual inertia.

FIG. 3 is an explanatory diagram for describing a shift between an estimation inertia (an estimation value) and an actual inertia, in which an actual inertia is illustrated on the horizontal axis as J and an estimation inertia estimated by the inertia estimating unit 22 is illustrated on the vertical axis as J~. "J~" in the specification is a substitute notation for a character formed by placing "~ (tilde)" above J (see the vertical axis in FIG. 3).

In FIG. 3, J indicates an actual inertia, J1 indicates an actual inertia before machining of the work W, and J2 indicates an actual inertia after machining of the work W. Moreover, J~ indicates an estimation inertia, J~1 indicates an estimation inertia before machining of the work W, and J~2 indicates an estimation inertia after machining of the work W.

When the estimation equation is set correctly, J~1−J=J1−J2. However, as illustrated in FIG. 3, a shift such as J~1=a×J1+b or J~2=a×J2+b occurs between the estimation inertia J~ which is an estimation value and the actual inertia J. Due to this, a relationship like the following equation is obtained.

$$J\tilde{}1 - J\tilde{}2 = a(J1 - J2) \quad (2)$$

Figure 4A:
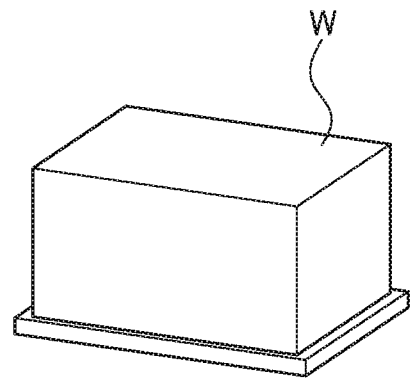
FIG. 4A is a schematic diagram illustrating an appearance of a work before machining.
Figure 4B:
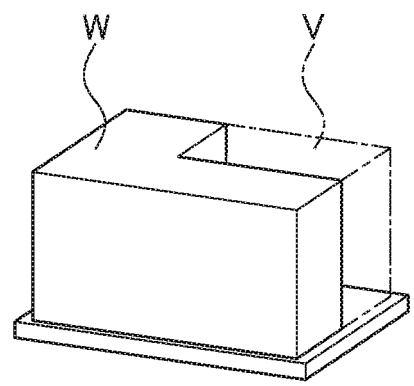
FIG. 4B is a schematic diagram illustrating an appearance of a work after machining.

Next, a process of correcting the inertia estimation equation to an appropriate estimation equation will be described. FIGS. 4A and 4B are explanatory diagrams illustrating an appearance of the work before and after machining. As illustrated in FIGS. 4A and 4B, since the work W is machined into a predetermined shape by machining, the weight of the work W changes before and after machining. A change in the inertia can be understood as a change in weight of the work W.

In the present embodiment, a decrease in an actual inertia is calculated on the basis of information possessed by the numerical controller 20. The numerical controller 20 has machining information such as information on a target shape, tool length correction, or time required for a spindle load and can calculate a volume decrease V (see FIG. 4B) resulting from machining by computation. For example, the volume decrease V is calculated by taking the influence on a volume decrease of the length and the width of a machining tool and time in which a cutting tool is not in contact with the work W in a machining operation by referring to a spindle load into consideration. By multiplying the calculated volume decrease V by a predetermined density, it is possible to acquire a weight decrease (a weight change).

In the present embodiment, the density is calculated by taking an effective mass into consideration. Generally, since an inertia moment of a rigid body is proportional to the mass of the rigid body and increases as the rigid body is distributed distant from a shaft, it can be considered that a virtually heavier object is set as the height (distance) to the position of the center of gravity of the work W from a predetermined reference position (for example, the core of the feed shaft 11) increases. Therefore, a weight obtained by performing a conversion process according to the distance to the position of the center of gravity of the work W from a predetermined reference shaft (the rotating shaft) is set as an effective load. In this conversion process, a relational equation of inertia I=mr2 (m: mass and r: distance from reference rotating position) can be used. For example, when the position of the center of gravity is high, a process of correcting the density to be high is performed to calculate the effective load, and the inertia change ΔJ is calculated on the basis of the effective load. The position of the center of gravity of the work W is obtained from coordinates input to the numerical controller 20.

Figure 5:
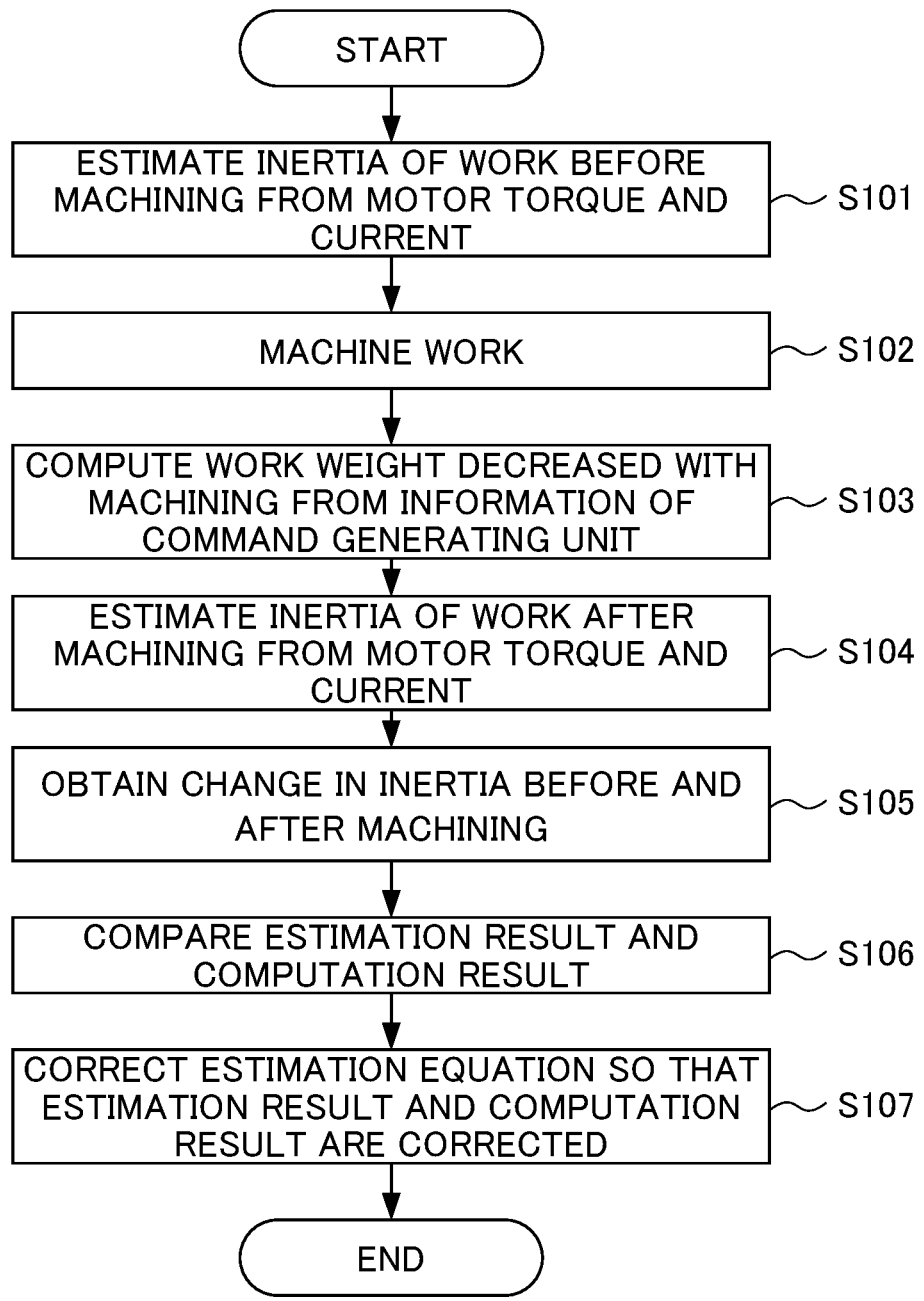
FIG. 5 is a flowchart of a process of correcting estimation of an inertia performed by the controller of the present embodiment.

FIG. 5 is a flowchart of a process of correcting estimation of the inertia performed by the controller of the present embodiment. The controller 2 drives the motor 10 so as to perform a predetermined operation on the work W to acquire a motor torque (the torque of the motor 10) and a current, and acquires the estimation inertia J~1 of the work W before machining on the basis of the motor torque and current feedback signals (step S101). After step S101 is performed, the work W is machined into a predetermined shape (step S102).

After the work W is machined in step S102, the difference computing unit 23 computes the weight of the work W decreased by the machining from the information of the command generating unit 21 (step S103). In the present embodiment, the weight of the work W is an effective load, and the decrease in the inertia ΔJ is calculated on the basis of the volume of the work W decreased by the cutting, the density set to the machining target work W, and the position of the center of gravity of the work W.

By a similar method to step S101, the motor torque (the torque of the motor 10) and current feedback signals are acquired, and the estimation inertia J~2 of the work W after machining is acquired (step S104). Subsequently, the inertia estimating unit 22 obtains an estimation inertia ΔJ~ as a change in the inertia before and after machining from the estimation inertia J~1 before machining and the inertia J~2 after machining (step S105).

The comparing unit 24 compares the estimation inertia ΔJ~ which is the estimation result of the inertia estimating unit 22 and the inertia ΔJ which is the computation result of the difference computing unit 23 (step S106). The comparing unit 24 corrects the estimation equation of the inertia estimating unit 22 so that the estimation inertia ΔJ~ matches the inertia ΔJ.

Although the processes of steps S101 to S106 are executed in a state in which the work W is set, the execution timing is not particularly limited thereto. For example, the correction may be executed at a certain stage of the machining operation, and depending on an occasion, the movement of the work W may be monitored regularly, and the correction may be executed regularly according to the movement of the work W.

According to the above-described embodiment, the following advantages are obtained. The controller 2 of the motor 10 that drives the work (a driven body) W includes: the command generating unit 21 that generates a movement command for the motor 10; the inertia estimating unit 22 that acquires feedback information (torque and current) of the motor 10 and estimates an inertia on the basis of a predetermined estimation equation; the difference computing unit 23 that computes a change in the inertia changed due to machining based on the movement command of the command generating unit 21; and the comparing unit 24 that compares a difference between the estimation results before and after the machining of the work W estimated by the inertia estimating unit 22 and a change in the inertia computed by the difference computing unit 23. The estimation equation of the inertia estimating unit 22 is corrected on the basis of the comparison result of the comparing unit 24 so that the difference in the estimation result matches the computation result of the difference computing unit 23. Correcting the difference so as to match the computation result of the difference computing unit 23 may mean correcting the same so as to approach the computation result as well as correcting the same so as to be strictly identical to the computation result.

In this way, it is possible to correct the estimation equation with high accuracy even when the work weight is not known since it takes advantage of the fact that a difference in the inertia estimation result before and after machining corresponds to a change in the weight resulting from actual machining. Since an accurate inertia can be estimated by reflecting the actual situation thereon, it is possible to perform various control operations which use the inertia accurately and efficiently.

In the controller 2 of the present embodiment, the difference computing unit 23 acquires the volume V (see FIG. 4B) of the work W decreased with machining from the command generating unit 21 and computes a change in the inertia on the basis of the volume V of the work and a density set in advance to the work W.

In this way, it is possible to calculate the change in inertia without measuring the weight of the work W.

In the controller 2 of the present embodiment, the inertia estimating unit 22 acquires an effective load on the basis of the weight changed with machining and center-of-gravity position information (the distance r2) indicating the position of the center of gravity of the work W and computes a change in the inertia on the basis of the effective load.

In this way, it is possible to estimate the inertia with higher accuracy since the position of the center of gravity of the work W that has influence on the inertia is reflected.

In the controller 2 of the present embodiment, the command generating unit 21 adjusts the acceleration or deceleration time constant of the motor 10 on the basis of the estimation result of the corrected estimation equation.

In this way, the acceleration or deceleration time constant is adjusted on the basis of the inertia estimated according to the weight of the work W lighter than the maximum loading capacity, it is possible to move the work W more efficiently and accurately and to improve the machining accuracy. It is possible to obtain effects advantageous from the viewpoint of efficiency and machining accuracy as compared to the conventional machine tool 1 in which the acceleration or deceleration time constant is set to the maximum loading capacity of the machine tool 1 from the viewpoint of stability.

While a preferred embodiment of the present invention has been described, the present invention is not limited to the above-described embodiment but may be changed appropriately.

EXPLANATION OF REFERENCE NUMERALS

W: Work
2: Controller
10: Motor
21: Command generating unit
22: Inertia estimating unit
23: Difference computing unit
24: Comparing unit

What is claimed is:

1. A controller of a motor that drives a driven body, the controller comprising:
   a command generating unit that generates a movement command for the motor;
   an inertia estimating unit that (i) receives a feedback signal from the motor, the feedback signal including feedback information related to the motor, and iii) estimates an inertia, using the feedback information, on the basis of a predetermined estimation equation, wherein the inertia estimating unit calculates a first estimation result and a second estimation result, the first estimation result being calculated before machining of the driven body is performed, and the second estimation result being calculated after the machining of the driven body is performed;
   a difference computing unit that computes a change in the inertia due to the machining of the driven body, the change in the inertia being computed based on the movement command of the command generating unit; and
   a comparing unit that compares (i) a difference between the first estimation result and the second estimation result calculated by the inertia estimating unit, and (ii) the change in the inertia computed by the difference computing unit, wherein
   the estimation equation used by the inertia estimating unit is corrected on the basis of a comparison result of the comparing unit so that the difference between the first estimation result and the second estimation result matches the change in the inertia computed by the difference computing unit.

2. The controller according to claim 1, wherein
   the difference computing unit acquires, from the command generating unit, a volume of the driven body decreased due to the machining of the driven body, and computes the change in the inertia on the basis of the decrease in the volume of the driven body and a density of the driven body.

3. The controller according to claim 1, wherein the command generating unit adjusts an acceleration or deceleration time constant of the motor on the basis of an estimation result of the estimation equation.

* * * * *